United States Patent [19]
Ito

[11] Patent Number: 4,570,870
[45] Date of Patent: Feb. 18, 1986

[54] WEB FEED MECHANISM FOR FEEDING A WEB FROM A ROLL

[75] Inventor: Kaoru Ito, Iwate, Japan

[73] Assignee: Kabushiki Kaisha Sato, Japan

[21] Appl. No.: 663,982

[22] Filed: Oct. 23, 1984

[30] Foreign Application Priority Data

Oct. 25, 1983 [JP] Japan ................................. 58-164074

[51] Int. Cl.⁴ ....................... G11B 15/22; B65H 23/06
[52] U.S. Cl. .................... 242/75.4; 242/156.1
[58] Field of Search ................... 242/75.4, 75.3, 75.43, 242/156.1, 197, 199, 204

[56] References Cited

U.S. PATENT DOCUMENTS 1,379,164  5/1921  Bullis ................................. 242/75.4
1,987,141  1/1935  Casper ............................... 242/75.4
3,243,137  3/1966  Norman ........................... 242/75.43

FOREIGN PATENT DOCUMENTS 390570  11/1973  U.S.S.R. ............................. 242/204

Primary Examiner—Stuart S. Levy
Assistant Examiner—Lloyd D. Doigan
Attorney, Agent, or Firm—Ostrolenk, Faber, Gerb & Soffen

[57] ABSTRACT

A web feed mechanism for stepwise or continuously feeding a web, such as a printing medium of a printer, or the like, from a roll of web. In the web feed mechanism, slackness, if any, can be absorbed by applying a drag force to the outermost winding of the web roll through a radially inwardly biased sliding member that slides tangentially of the web roll either in the forward direction, in which the web is to be let off from the web roll, or in the backward direction, in which the web is to be taken up onto the web roll. The sliding member is spring biased to slide backward. Upon the web being let off the web roll, the drag slides the sliding member forward, charges its spring and thereby keeps the web under tension. Upon discontinuance of web unwinding, slackness in the web is absorbed by the spring biasing the sliding member to drag the web roll to roll backward.

8 Claims, 2 Drawing Figures

WEB FEED MECHANISM FOR FEEDING A WEB FROM A ROLL

BACKGROUND OF THE INVENTION

1. Field of the Invention

The present invention relates to a feed mechanism for feeding a web, such as a printing medium of a printer, from a roll and, more particularly, to a web feed mechanism which permits either continuous or stepwise feeding of a web of small thickness.

2. Description of the Prior Art

Known feed mechanisms of this kind include only a dragging mechanism that simply resists web roll unwinding, e.g. by rubbing the outermost winding of the web. When such a feed mechanism is operated for stepwise feeding, a web being fed may overrun between feeding steps and become slack on its running path. As a result, the tension applied to the web on the running path cannot be constant, and this could cause problems, like the web making noises and/or moving in an undulating manner or wrinkling, tearing, etc.

SUMMARY OF THE INVENTION

The present invention seeks to avoid the above problem, and its object is to provide a web feed mechanism which can hold a web on a running path under a constant tension to avoid the above noted problems.

The present invention provides a web feed mechanism for feeding a web under a constant tension from a web roll. It includes a carrier which is movable toward and away from the center of the web roll and that is biased toward that center. A slide supported on the carrier includes a drag surface that contacts and applies a drag to the outermost winding of the web roll. The slide in contact with the web roll is slideable along a tangent to the web roll in both the forward direction, which is the direction in which the web is let off from said web roll, and the backward direction, the direction in which the web is to be taken up onto the web roll. Biasing means bias the slide in the backward direction to hold the let-off portion of the web under predetermined tension while the web is being let off. This tension is caused by the balance between the drag exerted by the slide biased backward and a pulling force being exerted upon the let-off portion of the web. As a result, the let-off portion of the web can be prevented from making noises and/or from experiencing undulating runs, which might otherwise be caused by the fluctuations of the tension applied to the web.

For stepwise feeding of a web from a roll while tensioning it, the mechanism of the invention comprises the biasing means for biasing the slide in the backward direction. These slide biasing means have their biasing force strengthened, i.e. the biasing means is increasingly charged, by the pulling of the let-off portion of the web through the frictional engagement between the slide and the outermost web portion. This also tensions the let-off portion of the web. Web tensioning continues until the slide is brought forward into a first position during one feed stroke of the web. Upon release of the let-off portion of the web, the biasing means then causes the slide to slide backward while it is in frictional engagement with the outermost winding of the web roll, until the slide reaches a second position. This spins the web feed roll backward for absorbing web slackness, if any, that is due to the overrun of the let-off portion of said web.

In short, the present invention provides a web feed mechanism which is able to absorb the slackness of the web on the running path by applying a drag to the outermost winding of the web roll through a slide which slides tangentially of the web roll in both the forward, web let-off direction and the opposite, backward, web take-up direction.

BRIEF DESCRIPTION OF THE DRAWING

Other objects, features and advantages of the present invention will become apparent from the following description taken in conjunction with the accompanying drawings, in which.

DESCRIPTION OF THE PREFERRED EMBODIMENT

The present invention is described with reference to a feed mechanism for feeding a web, namely the heat transfer carbon paper or ribbon of a heat transfer type thermal printer. However, the invention is not limited as to the webs to be fed thereby.

Figure 1:
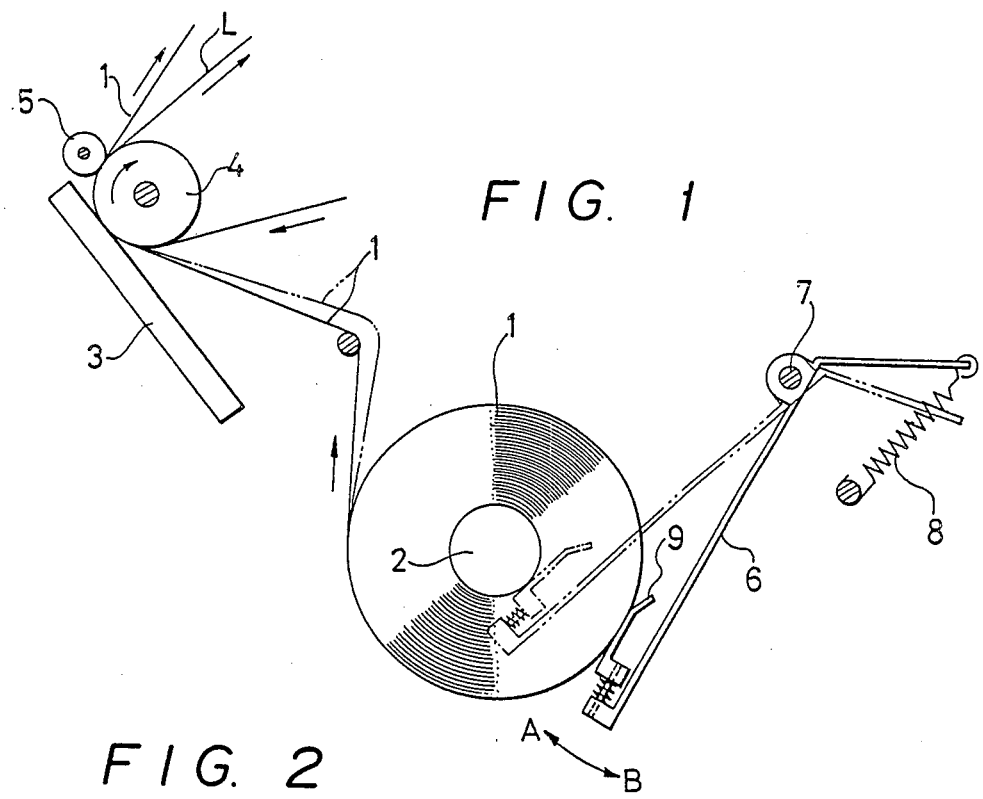
FIG. 1 is a schematic view showing a web feed mechanism according to one embodiment of the present invention.

As shown in FIG. 1, the heat transfer carbon paper or other material, flexible web 1 is held in the form of a roll on a holding core 2 that is fixed in position on the frame (not shown) of a printer. The heat transfer carbon paper 1 is let off the core 2 and is fed into a clearance between a thermal head 3 and a platen roller 4 so that the carbon paper web can be used to print a continuous separate web of labels L. The web 1 is fed out by the coaction of the platen roller 4 and a follower roller 5.

A lever 6, which acts as a carrier, is hinged by a pin 7 on the frame of the printer. The lever 6 is always biased by the biasing force of a coil spring 8 so that its main arm is biased toward the core 2, i.e., toward the outermost winding of the paper roll 1 (i.e., in the direction of arrow A). The lever 6 can swing toward and away from the core 2 (i.e., in the directions of arrows A and B) for following changes in the external diameter of the paper roll 1.

The lever 6 carries a slide plate 9 on the portion which comes close to the paper roll 1 and at the side facing that roll. The slide plate 9 is carried or supported on the lever 6 by a guide shaft 10 that is anchored to the lever 6 such that it can slide along the longitudinal directions of the lever 6, which are the tangential directions of the paper roll 1. The tangential directions are forward in the direction of arrow C, the direction in which the paper is to be let off from the paper roll, and backward in the direction of arrow D, the direction in which the paper is to be taken up again onto the paper roll 1. The slide plate 9 is also biased backward in the direction D at all times by the biasing force of backspin coil spring 11. At the same time, the slide plate 9 is biased toward the core 2 along the guide shaft 10 and the lever 6 by the biasing force of the coil spring 8. As a result, the slide plate 9 applies drag to the outermost winding of the paper roll 1 being fed.

In order to ensure that drag will occur, a drag rubber 12 covers that surface of the slide plate 9, which is to be brought into contact with the outermost winding of the paper roll 1. The drag rubber 12 has a friction face that contacts that outermost paper winding. The friction face of the drag rubber 12 is shaped to extend generally flat along the tangential directions of the paper roll 1. But, it is bent, at its trailing end, in a direction away from the core 2 for enabling the drag rubber to smoothly contact the outermost winding of the paper roll 1.

The operation of this web feed mechanism is now described.

When the heat transfer carbon paper 1 is pulled from its leading end and is unrolled in accordance with the progress of the printing operation at the thermal head 3, friction force is established between the drag rubber 12 and the carbon paper web 1 so that the slide is shifted forward of the carrier and the biasing force of backspin coil spring is strengthened by the pulling force on web 1 through the friction force established between rubber 12 and the web. The let-off portion of the carbon paper web 1 is dragged and tensed by the slide plate 9 until the slide plate 9 has been moved in the forward direction C into a first position, indicated by solid lines in FIG. 2. This occurs during one feed stroke of the carbon paper web 1 against the biasing force of the coil spring 11 being strengthened.

Once the pulling force on the web 1 overcomes the biasing force of the coil spring 11 during that feed stroke and fully compresses the spring 11, the let-off portion of the carbon paper web 1 is thereafter pulled to frictionally slide on the surface of the drag rubber 12. As a result, the paper roll 1 is revolved to stepwise let off one pitch of the carbon paper web 1 having a length corresponding to a turn of the platen roller 4. At this particular instant, i.e., just at the end of the feed stroke, the slide plate 9 still takes the first position where it is shifted in the direction C with the coil spring 11 compressed.

Figure 2:
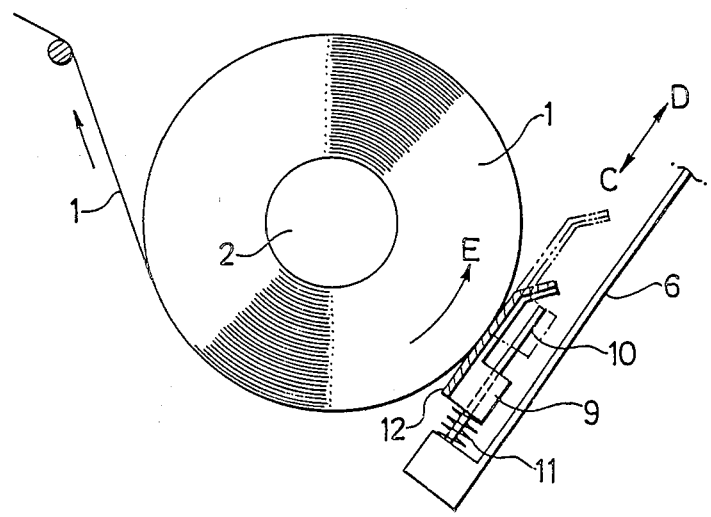
FIG. 2 is an enlarged schematic view of the web feed mechanism of FIG. 1.

After the feed stroke, when the pulling force on the web 1 is weakened to zero, the biasing force of the compressed coil spring 11 causes the slide plate 9 to frictionally or smoothly slide in the backward direction D along the outermost winding of the paper roll 1 and into a second or initial position, which is indicated by doubledotted lines in FIG. 2. The frictional engagement between the slide and the roll 1 enables biasing force of spring 11 to thereby return the paper roll 1. The weakening of the pulling force on the let-off portion of the paper roll may also be caused by the slackness of that let-off portion the running path, as indicated by a double-dotted line in FIG. 1. The slackness is due to the overrun of the let-off web portion, because the turn of the platen roller 4 is a stepwise or intermittent one so that it imparts an inertia at some level to the carbon paper web 1. The slackness can be absorbed through the backward frictional sliding movement of the slide plate 9 and the drag rubber 12 in the direction D, which is caused by the biasing force of the backspin coil spring 11. The friction turns the paper roll 1 in the backward direction, as indicated by letter E in FIG. 2, for eliminating the slackness in the web.

By repeating the stepwise operations thus far described, the slide plate 9 slides in the forward direction C and then in the backward direction D to eliminate the slackness of the let-off carbon paper web 1 on its running path. This prevents generation of noises.

The simple dragging device of the feed mechanism of the prior art produces slip loss of the heat transfer carbon paper web 1, which is caused at the thermal head 3 at the rise in the rotations of the platen roller 4. In the invention, this can be absorbed and dropped by the quick sliding movement of the slide plate 9 in the forward direction C. Moreover, the carbon paper web 1 on the running path can always be held under constant tension by the drag which is ensured as a result of the frictional sliding movements of the slide plate 9 in the directions C and D and by the biasing force of the lever 6 in the direction A.

The present invention has been described as applied to a printer of stepwise feed type, but it can be applied to any feeding mechanism. Moreover, the application of the present invention should not be limited to the heat transfer carbon paper having a very small thickness but to any suitable web.

If the present invention is applied to a printer of the continous feed type, for example, the backspin coil spring 11 may bias the slide plate 9 in the backward direction D during the pulling operation to hold the let-off portion of the carbon paper 1 under tension caused by the balance between the drag and the pulling force.

As has been described herein, according to the present invention, a very thin web, such as heat transfer carbon paper, can be subjected to back tension while assuredly running forward and backward in the feed direction. As a result, no slackness occurs in the web on the running path so that the let-off portion of the web can be prevented from generating noises and/or from loose or undulating runs, which might otherwise be caused by the fluctuations or interruptions of the tension applied to the web.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A web feed mechanism for feeding a web under constant tension from a roll, comprising:

a web wound on a roll; a main carrier supported for movement toward and away from the roll;

a slide having a surface shaped and positioned for contacting the outer winding of the web roll; the slide being supported on the main carrier for sliding along a pathway tangential to the roll; the roll having a forward direction of rotation in which the web is let off the roll and the roll having a backward direction of rotation in which the web is taken up onto the roll; the slide being movable with respect to the main carrier in both the forward and backward directions of the roll, and those slide movements are tangential to the roll;

first biasing means for biasing the main carrier toward the roll; the first biasing means biasing the main carrier for biasing the slide against the outermost winding of the roll for the slide to apply drag to the outermost winding of the web; and second biasing means for biasing the slide in the backward direction and with respect to the carrier, whereby as the web is let off the roll, the contact between the outermost winding and the slide drags the slide in the forward direction and increasingly charges the second biasing means for increasing the tension on the let-off portion of the web until the web slides with respect to the biased slide; the main carrier being movable along the pathway toward and away from the center of the web roll and the first biasing means biases the carrier toward the center of the web roll; the main carrier including a lever that is supported for hinged, swinging motion toward and away from the center of the web roll and the first biasing means biases the lever toward the center of the web roll; the slide including a drag element on the surface thereof facing the outermost winding of the web roll, and that drag element includes a friction face for contacting the outer winding for ensuring drag thereon; the drag element comprising a drag rubber; the contact surface of the drag rubber having a plane shape.

2. The web feed mechanism of claim 1, wherein the drag element friction face extends generally flat along the direction tangential to the web roll.

3. The web feed mechanism of claim 2, wherein the friction face has a trailing end at the end thereof that is in the backward direction along the slide and the trailing end is turned away from the center of the web roll for providing a smooth transition for initial contact with the outermost winding of the web roll.

4. The web feed mechanism of claim 1, further comprising a guide shaft mounted on the main carrier for supporting the slide thereon, the guide shaft and the carrier being shaped for guiding the sliding movement of the slide along a pathway tangential to the web roll.

5. The web feed mechanism of claim 4, wherein the second biasing means includes a spring mounted around the guide shaft and compressible between the main carrier and the slide upon movement of the slide in the forward direction.

6. The web feed mechanism of claim 5, wherein the second biasing means comprises a coil spring mounted on the guide shaft and sandwiched under compression between the main carrier and the slide.

7. The web feed mechanism of claim 1, wherein the second biasing means is for biasing the slide to move in the backward direction and the contact between the slide and the web roll is for rotating the web roll in the backward direction after removal of force applied for letting off the web, whereby backward movement of the slide for causing backward rotation of the web roll absorbs slackness in the let-off portion of the web.

8. The web feed mechanism of claim 7, wherein the slide has a first position in the forward direction which is the position to which the slide is moved by the engagement between the slide and the outer winding of the web roll as the web is let off, and the slide has a second position which is the position to which the slide is moved by the second biasing means after removal of force on the web for unwinding the web from the roll.

* * * * *